United States Patent [19]

Huber et al.

[11] Patent Number: 4,546,790
[45] Date of Patent: Oct. 15, 1985

[54] FLUID VALVE

[75] Inventors: Richard Huber, Vienna, Austria; Peter Wirz, Unterkulm, Switzerland

[73] Assignee: Klinger AG, Zug, Switzerland

[21] Appl. No.: 482,837

[22] Filed: Apr. 7, 1983

[51] Int. Cl.⁴ .................................... F16K 5/06
[52] U.S. Cl. ............................ 137/315; 137/540; 251/63; 251/250; 251/324; 251/315; 251/366
[58] Field of Search ............... 251/315, 316, 317, 170, 251/192, 362, 363, 366, 63, 63.5, 250, 324; 137/540, 315

[56] References Cited

U.S. PATENT DOCUMENTS

| | | | |
|---|---|---|---|
| 2,573,177 | 10/1951 | Bohlen | 29/157.1 |
| 3,490,734 | 1/1970 | Freeman | 251/315 |
| 3,819,150 | 6/1974 | Katrup | 251/315 |
| 4,006,881 | 2/1977 | Gaillard | 251/315 |
| 4,217,923 | 8/1980 | Kindersley | 251/315 |
| 4,258,900 | 3/1981 | Kindersley | 251/315 |
| 4,269,391 | 5/1981 | Saito et al. | 251/315 |

FOREIGN PATENT DOCUMENTS

| | | |
|---|---|---|
| 2235557 | 2/1973 | Fed. Rep. of Germany . |
| 7910913 | 5/1980 | Fed. Rep. of Germany . |
| 1427882 | 4/1966 | France ................ 251/315 |

Primary Examiner—Martin P. Schwadron
Assistant Examiner—James R. Shay
Attorney, Agent, or Firm—McCormick, Paulding & Huber

[57] ABSTRACT

The fluid valve comprises an integral housing made of forged steel, the housing having tubular end portions as fluid inlet and outlet, respectively, conical transition zones having a cone angle of at least 30°, and a central enlargement joined by said transition zones to said inlet and outlet ducts. The valve system is positively held between the transition zones. One of the transition zones may form the valve seat cooperating with an axially displaceable valve body.

8 Claims, 5 Drawing Figures

FLUID VALVE

The invention relates to fluid valves comprising a housing through which the fluid flows and a valve system disposed in the housing and moveable therein so to control or switch the fluid flow.

The valve system may comprise any known combination of a valve seat and a valve member, the valve seat sometimes being part of the housing itself. In other cases, the valve system may be a subassembly comprising a casing, a valve seat and a valve member, such subassembly simply being mounted in the very housing. The valve system may be adapted to be actuated externally, e.g. in case of a control valve system, the actuation being manual or pneumatic or electric or still otherwise. In other cases, there is no need for external control, e.g. in case of a simple check valve.

The present invention is applicable in any such design because it relates primarily to the outer housing of the valve system.

Conventionally, the outer housing comprises a tubular fluid inlet and a tubular fluid outlet coaxial with the inlet. Inlet and outlet are welded to a central member having greater radial dimensions than inlet and outlet so to accomodate the valve system. Another known housing comprises a first part, consisting of inlet tube and one half of the central member while a second part comprises the outlet tube with the second half of the central member, a weld seam being provided at the joint between the two halves of the central member.

The necessity to weld the individual parts of the housing involves the necessity to carefully test the welds with regard to leaks, and weld seams are in general less resistant to corrosion than their basic metal.

It is the object of the present invention to provide a fluid valve without weld seams of the housing.

In accordance with the present invention, the housing has an inlet tube of a given diameter, an outlet tube of the same diameter, and a central member having a diameter exceeding that of inlet and outlet tube. Inlet and outlet tube are joint to the central member by conical intermediate members having a cone angle of at least 30°, and all these parts (inlet/first cone/central member /second cone/ outlet) in fact are portions of one integral piece of metal obtained by a chipless deformation process. The central member houses the valve system, and the inner cone surfaces serve the purpose of positioning and, as the case may be, sealing of the valve system.

It will be understood that the valve system is to be mounted in the central member prior to the formation of the second cone and outlet (or, alternatively, of the first cone and inlet). Chipless deformation processes are subject to high tolerances, and it may be advisable to provide, as parts of the valve system, elements which balance dimentional deviations.

Further objects, advantages and features of the invention will become apparent by the following description of embodiments incorporating the invention, reference being made to the attached drawings.

Figure 1:
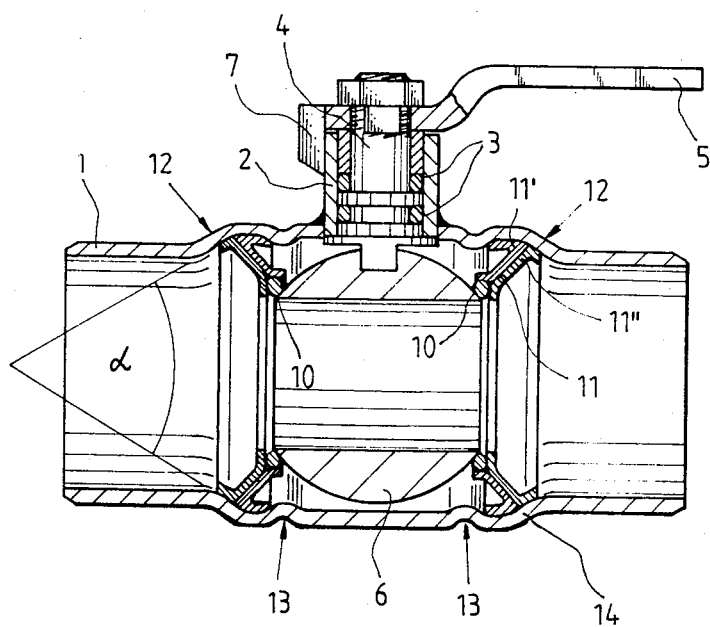
FIG. 1 is an axial section veiw of a ballcock acording to the invention.

The ballcock illustrated in FIG. 1 has a housing 1 made from a tube. Mounted in a tubular piece 2 welded to this housing is a movement pin 4 which is sealed off from outside via O-rings 3 and which carries a handle 5 at its outer end, its end located in the housing engaging into the ball 6 forming the switching device, so that this ball can be rotated by the handle 5, a stop 7 limiting the rotary movement to 90°.

The ball 6 is mounted rotatably between sealing rings 10 which are connected to the inner periphery of the housing tube 1 via support parts 11 molded from sheet metal. These support parts 11 consist of two disk-shaped sheet metal moldings 11',11" arranged next to one another. At the inner edge, these are designed so that together they form the receptacle for the sealing ring 10; at the outer edge, they have cylindrical edge portions which rest against the tubular housing 1 and which point away from one another. These edge portions are supported in an axial direction on inward-pointing deformations of the tubular housing 1. The ballcock illustrated has drawn-in cylindrical housing end portions 1' which have a smaller diameter in comparison with the middle piece of the housing 1 which has the original tube diameter, this being achieved by means of subsequent three-dimensional deformation of the cylindrical tube. The conical intermediate portions 12 between the housing end portion 1' serve as a support for the outward-pointing edge portion of the outer disk-shaped sheet-metal moldings 11", whereas the edge portions, directed towards the centre of the cock, of the inner disk-shaped sheet-metal moldings 11" are supported on beads 13 extending in a peripheral direction. It is also advantageous, here, if the edge portions have a slight conicity, so that they rest with prestress against the inner periphery of the housing 1. Located in the region of the transitions between the conical portions of the sheet-metal moldings 11',11" and the edge portions is an O-ring 14 which also rests against the inner periphery of the tubular housing 1, so that the two sheet-metal moldings 11',11" and the housing 1, are sealed off from one another. The two diskshaped sheet-metal moldings 11',11" forming the support part 11 for receiving the sealing rings 10 can be joined together into one piece by means of spot-welding, and the O-ring 14 projects beyond the edge portions and, therefore, when introduced into the tubular housing 1, rubs against the inner periphery of the housing 1. However, it is also possible to insert the two disk-shaped sheet-metal moldings 11',11" into the ballcock separately, so that the O-ring 14 can be introduced without rubbing particularly against the housing 1.

To produce the ballcock, either the cylindrical housing end portion 1' can first be made on one side, and then a support part 11, the ball 6 and the other support part 11 can be introduced in succession and fixed in their correct positions in the housing 1, whereupon the other deformations of the tubular housing 1 are carried out. However, it is also possible to insert the inner parts 10, 11, 6 into the non-deformed tube and only then carry out all the deformations of the tube at the same time. A cone angle α of 50° guarantees, here, that the axial distance between the inner surfaces of the intermediate portions 12 does not vary inadmissably as a result of the tube tolerances. When the inner parts 10, 11, 6 of the ballcock are fixed at the correct points on the housing, it is also possible, before the deformation of the housing, to ensure by means of a clamping device that the support parts 11 are moved so far towards one another at their outer periphery that the sheet-metal moldings 11',11" are deformed in the portion extending conically and rest with prestress against the sealing rings 10. Such elastic distortion is necessary above all at relatively high operating pressures, so that even after a certain amount of wear of the sealing rings 10 the pressure exerted by the ball 6 is still sufficient. In a ballcock with a one-piece tubular housing 1, the design illustrated makes it possible to provide a construction which is simple in welding terms and which guarantees reliable operation.

Figure 2:
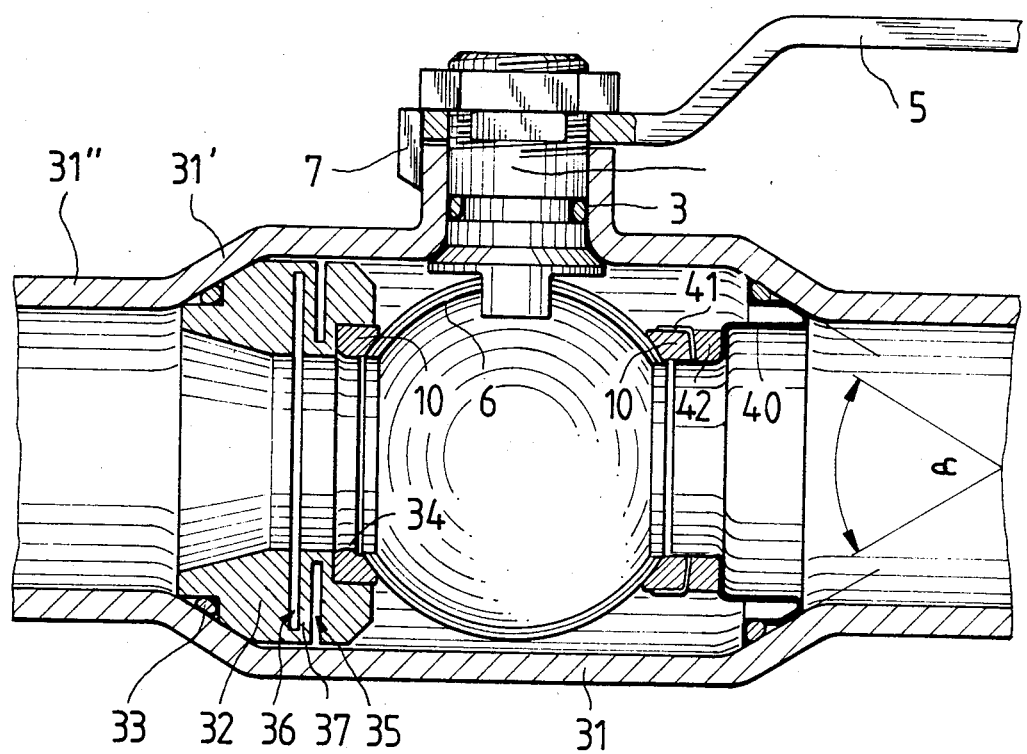
FIG. 2 is an axial section view of an alternative ballcock according to the invention.

The ballcock which can be seen in FIG. 2 has a housing 31 which is made from a tube and in which the guide for the movement pin 4 is also molded out from the tube itself. The housing 31 therefore has no weld seam. The conical intermediate portions 31', which are formed as a result of shaping on the outside wall of the tube and which then merge into the cylindrical housing end portions 31", have a cone angle α of 60°. When a tube having normal tube tolerances is used, in the case of a ball passage of 40 mm the axial distance between the inside walls of the conical intermediate portions 31' can vary approximately 1.5 mm, and in such a case, without the provision of additional measures, the steep cone angle is not sufficient to keep the pressure exerted between the ball 6 and the sealing rings 10 within permissible limits.

The left half of FIG. 2 shows lathe-turned support parts 32 which are supported by the use of a conical surface on the inside wall of the intermediate portion 31', an O-ring 33 being provided for sealing-off purposes. At the other end, the sealing ring 10 for sealing off from the ball 6 is located on the support part 32, and this sealing ring is inserted sealingly into the support part 32 on the outer periphery. Inserted between the support part 32 and the sealing ring 10 is a guide part 34 resembling a plate spring, which also serves to compensate the wear of the sealing ring 10 after a relatively long period of operation or to compensate distortions which arise as a result of external forces or thermal causes because of the deformation of the housing 31. In the region between the two gaskets located at the ends, the support part 32 has an annular groove 35,36 from the outside and from the inside respectively, and these annular grooves form an axially deformable tolerance absorber.

The ballcock illustrated in FIG. 2 has a housing 31 with a maximum axial distance, resulting from the tolerances, between the conical inside walls of the intermediate portions 31'. The tolerance absorber is therefore undeformed, and the annular grooves 35,36 in the support part 32 have parallel walls. In the event that a shorter axial distance between the conical inside walls arises because of tolerances during production, the support part 32 would be shortened axially because the wall 37 between the annual grooves 35, 36 assumes a conical shape; at the same time, the radial portion of the guide part 34 becomes flattened. The deformation resistance of this tolerance absorber in the support part 32 must be so high, here, that although deformation is possible, during the production of the housing, without damage to the sealing ring 10, nevertheless in the closing state, under operating pressure, the ball 6, not mounted on bearings, is supported securely without any further axial displacement. In this way, therefore, the axial distances between the conical inside walls, which result from the thickness tolerance during the external deformation of the tube, are compensated, without the support parts 32 having to be connected firmly to the tube after the operation of shaping the latter.

The right-hand side shows the design of a support part 40 in the form of a sheet-metal molding which receives the sealing ring 10 sealingly against the inside surface. Although the support part 40 has slight inherent elasticity in an axial direction, nevertheless it cannot absorb the large tolerances concerned. For this purpose, there is between a guide part 41 and a support part 40 a plastic ring 42 which is undeformed in the situation illustrated (maximum axial distance). When the tube thickness is relatively large, during the deformation of the tube, the support part 40 is moved nearer to the ball 6 (the guide part 41 being flattened), and the plastic ring 42 designed as a tolerance absorber is deformed three-dimensionally inwards, with a decrease in its thickness. For example, the plastic ring 42 can be made of polytetrafluoroethylene (PTFE), whereas the sealing ring 10 is made of glass-fiber-reinforced PTFE. Since the compressive strength of glass-fiber-reinforced PTFE is approximately twice as great as that of simple PTFE, when the support part 40 is displaced towards the ball 6 as a result of the tolerance it is the PTFE ring 42 and not the sealing ring 10 which is deformed. It would, in most cases, be a more unfavourable solution to make the plastic ring 42, designed as a tolerance absorber, of elastomeric material. Apart from the fact that almost all elastomeric materials have a lower temperature resistance than PTFE, the tolerance absorber would have to be made significantly longer, so that the forces acting on the ball 6 via the sealing ring 10 can be kept approximately equal in magnitude for the deformation distances concerned. If appropriate, a tolerance absorber consisting of elastic plastic would also have to be guided partly on the inside. This applies similarly to a tolerance absorber to be made from a metal spring, because, for the reasons explained above, this would also have to be made longer than a tolerance absorber which is deformable above all three-dimensionally.

Figure 3:
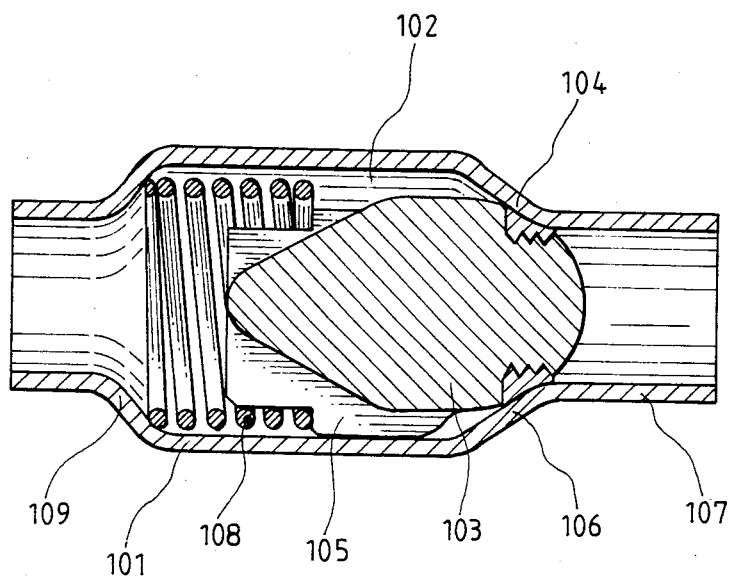
FIG. 3 illustrates in axial section view a check valve according to the invention.

The check valve illustrated in FIG. 3 comprises a tubular housing 101 having a tubular enlargement 102, the housing being manufactured by seamless deformation of a tube so that there are no weld seams. In the interior of the enlargement 102 a valve member 103 is disposed having an axial section shape similar to a droplet, guide ribs 105 being provided at one end of the valve member so to centrally position the latter within the enlargement 102. At the other end the valve member or valve body 103 is provided with a sealing ring 104 made of plastic material adapted to cooperate, in the closed status of the valve, with the conical transition zone 106 between enlargement 102 and a tubular inlet portion 107 of the housing. The guiding ribs 105 have steps on which a coil compression spring 106 abuts, the other end of the spring being supported at the conical transition zone to the fluid outlet portion 109; it will be noted that this transition zone 109 has a greater cone angle than the transition zone 106 which serves as the valve seat. The fluid valve of FIG. 3 operates like any ordinary check valve but has an integral seamless housing consisting of forged steel.

Figure 4:
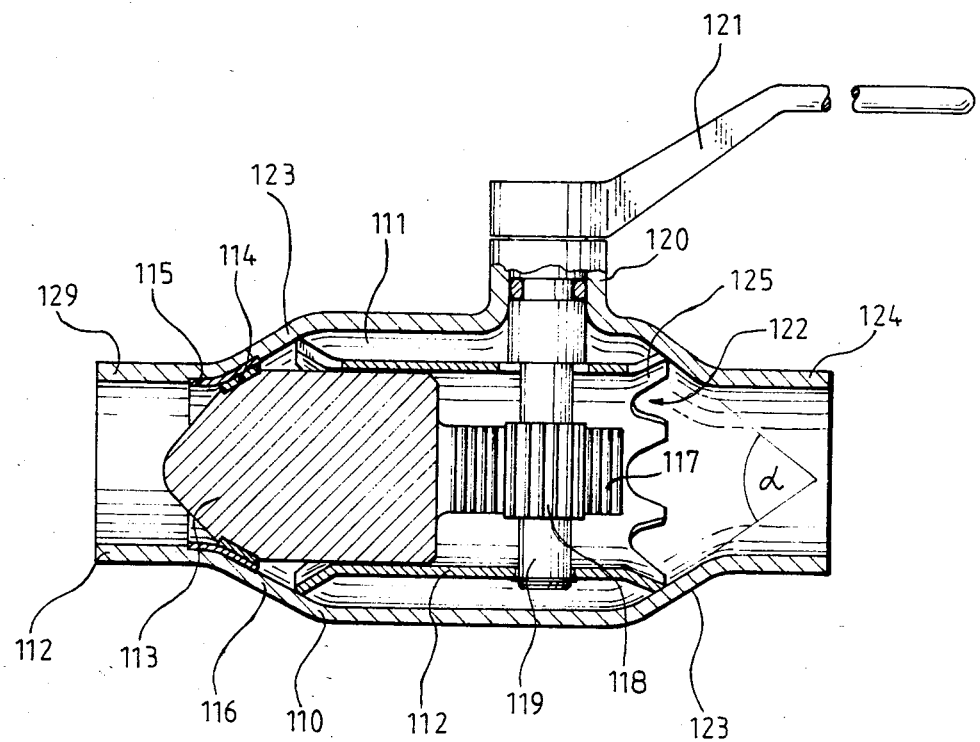
FIG. 4 is an axial section view of a control valve according to the invention.

The valve illustrated in FIG. 4 also has a tubular housing 110 with a tubular enlargement 111, a tubular casing 112 being housed in enlargement 111 and serving the guidance of the valve member 113. This valve member is slidably received in casing 112 and has at one of its ends a metalic sealing 114 cooperating with an annular seat 115 in the transition zone 116 between enlargement 111 and tubular end portion 112, the metalic sealing 114 and the annular seat 115 consisting of a material which resists abrasion. The other end of valve member 113 carries a toothed rack 117 engaging a toothed pinion 118 of an actuation shaft 119, shaft 119 being rotatably journalled in casing 112 and having at its free end sealing means to provide a fluid guide seat in a protuberance 120 of housing 110. The distal end of actuating shaft 119 carries an actuating handle 121 by means of which pinion 118 may be rotated so to displace valve member 113 between a closed and an open position. The casing 112 is provided, at its ends, with indentations 122 permitting fluid passage through the annular space between housing 110 and casing 112.

It is to be understood that the casing 112 must be rigidly positioned within the housing. The elements of the valve system being disposed in the housing prior to the final deformation of the latter, the housing may be deformed into its final shape by exteriorly attacking tools only. The tube thickness tolerances, consequently will affect the dimensions of the interior of the enlargement of the housing. The fixing of the casing, thus, may be provided either by positive fastening, as by welding, or by interengaging surfaces. The latter design is shown in FIG. 4. In order to obtain really a positive fixing of the casing two important features are provided. At first the conical transition zone 126 between the end portions 124 and the enlargement 111 have a rather great cone angle α of at least 30° so that the wall thickness tolerances of the tube will only slightly affect the axial dimension variations of the interior of the enlargement. Second, the ends of the tubular casing 112 are conically flaired outwards. Since because of the indentations provided in the flairings there will remain only individual extensions 125 these may be deformed inwards if because of material displacement of the housing tube assembling forces will act upon them so that the casing after finalisation of the housing will rigidly be mounted between the transition zones.

Figure 5:
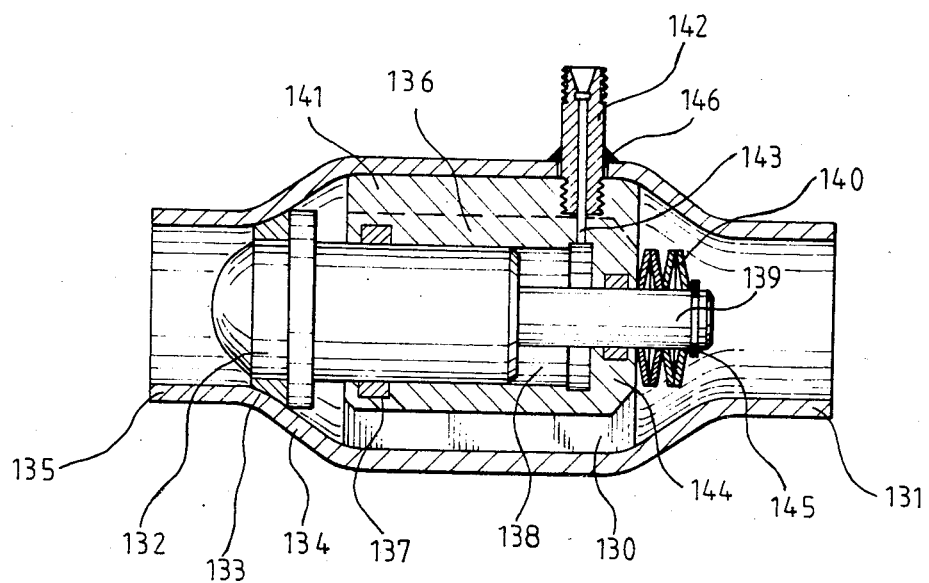
FIG. 5 shows a control valve according to the invention also in an axial section view.

FIG. 5 illustrates a fluid valve according to the invention which is a control valve actuated by pressurized medium. Housing 131 is again an integral forged steel piece having an enlargement 130. The valve body or valve member 132 has at one of its ends a soft sealing 133 cooperating with the conical transition zone 134 between enlargement 130 and end tube 135, the cone, thus, acting as the valve seat itself. The valve body is displaceable in a casing 136 and sealed therein by means of an O-ring 137. The casing is inserted into the enlargement 130 and forms beyond the central portion of the valve body the inner space 138 which may be subjected to pressure of a control medium. The other end portion 139 of the valve body has a reduced diameter and intersects in sealed manner the end wall 144 of the casing, a series of cup-springs 140 being interposed between casing bottom 144 and a support ring 145 mounted at the end portion 139 of the valve body. At its outer wall the casing 136 has several axially extending ribs 141 which keep the casing aligned in the housing and define passages for fluid flow. To fix the casing in the housing it is wedged therewith at its ends during the final deformation of the housing body. One of ribs 141 is provided with a bore 143 opening into space 138 and to provide an inlet for the control medium, a tubular fitting 142 is sealedly threaded into the respective rib 141 and sealed against the housing by, for example, a weld seam 146. Via fitting 142 and bore 143 in the casing, thus, into the space 138 within casing 136 pressurized medium may be introduced which will displace the valve body 132 against the bias of the cup spring column 140 so that it will seal against the valve seat. Upon removal of the medium pressure the springs will return the valve body into the open position. The fluid valve again has an integral housing made of forged steel without welding seams which would be subjected to the fluid pressure.

We claim:

1. A fluid valve, comprising a housing having
   a first tubular end portion,
   a tubular central portion of increased diameter,
   a first trunconcial intermediate portion joining said first end portion to said central portion of increased diameter, and
   a second tubular end portion,
   a second trunconical portion joining said central portion to said second tubular end portion, the housing being of unwelded integral construction, and said trunconical portions having cone angles of at least 30°, and
   a valve system means disposed in said central housing portion and comprising at least one valve body,
   a support means, sealing means, and at least one tolerance absorbing means subject to variable compression
   whereby said valve system is axially clamped with said tolerance absorbing means under varying compression between said trunconical portions and is operative regardless of production tolerances affecting axial clearance between said trunconical portions,
   said tolerance absorbing means being plastically deformable and disposed between said trunconical intermediate portions and said valve system, and said deformable means being deformable by assembling forces but non-deformable by valve actuating forces.

2. A fluid valve according to claim 1, wherein a guiding and supporting means for the valve system is provided and comprises a casing which is disposed in said tubular central portion and, sealed against the latter.

3. A fluid valve according to claim 1, wherein the valve system is positively engaged by said trunconical housing portions.

4. A ballcock having the features of claim 1, wherein sealing rings supporting the ball valve body are disposed in supporting elements which in turn abut in sealed manner said transition portions, said tolerance absorbing means being more easily deformable than said sealing rings but being nondeformable under the load exerted by the ball valve body.

5. A ballcock according to claim 4, wherein said supporting element is an integral portion of said deformable tolerance absorbing means.

6. A ballcock according to claim 5, wherein said tolerance absorbing means is axially supporting said sealing ring which is sealingly engaging with its circumference said supporting element.

7. A ballcock according to claim 6, wherein said tolerance absorbing means comprises a plastic ring which is easier deformable than the material of which said sealing ring is made.

8. A fluid valve according to claim 1, wherein the enlargement of the tubular housing is at least in part provided with a coating resistant against corrosion.

* * * * *